United States Patent [19]
Sabo

[11] Patent Number: 5,174,073
[45] Date of Patent: Dec. 29, 1992

[54] SHIELDING SYSTEM AND METHOD

[76] Inventor: Robert Sabo, 291 Indian Paintbrush, Casper, Wyo. 82604

[21] Appl. No.: 778,315

[22] Filed: Oct. 16, 1991

[51] Int. Cl.⁵ .......................... E04B 1/34; E04H 15/08
[52] U.S. Cl. ............................................ 52/3; 135/89
[58] Field of Search ................... 52/3; 135/99, 88, 89, 135/90, 905, 907; 160/327-329

[56] References Cited

U.S. PATENT DOCUMENTS

| | | | |
|---|---|---|---|
| 1,918,423 | 7/1933 | Persinger | 52/3 X |
| 4,733,683 | 3/1988 | Pozzi | 135/89 |

Primary Examiner—David A. Scherbel
Assistant Examiner—Beth A. Aubrey
Attorney, Agent, or Firm—Dean P. Edmundson

[57] ABSTRACT

A portable shielding system for shielding (i.e., covering) an object to camouflage it, screen it from sunlight, or to provide temporary shelter in the field. The system includes an elongated container and a length of flexible sheet material stored in the container. The sheet material can be withdrawn from the container, placed over the object, and then secured to the ground on opposite sides of the object.

13 Claims, 2 Drawing Sheets 5,174,073

SHIELDING SYSTEM AND METHOD

FIELD OF THE INVENTION

This invention relates to methods, techniques and systems for shielding or covering equipment, land area, ponds, etc. More particularly, this invention relates to methods, techniques and systems for temporarily shielding or covering various objects.

BACKGROUND OF THE INVENTION

There are many situations where it is necessary or desirable to temporarily shield or cover various equipment or other objects to camouflage them, to screen them from sunlight, or to provide temporary shelter in the field. Although tarps or the like can be used for this purpose, tarps are cumbersome to handle and transport. Also, some type of anchoring system must be used to secure the tarps in place, e.g., ropes, poles, stakes, etc. which must be separately carried and affixed.

There has not heretofore been provided a simple and effective system for shielding or covering objects.

SUMMARY OF THE PRESENT INVENTION

In accordance with the present invention there is provided a portable shielding system for temporarily shielding an object (e.g., a piece of equipment, hunting blinds, ponds, camping area, etc.). In one embodiment the shielding system comprises:
- (a) an elongated tubular container or housing having a side wall; wherein the side wall includes an elongated opening;
- (b) a length of flexible sheet material carried in the container; wherein the sheet material includes a first end which is secured in the container and a second end which is accessible through the opening; wherein the sheet material can be withdrawn from the container by pulling the second end of the sheet material; and
- (c) retraction means for retracting the sheet material into the container.

The portable shielding system of the invention has a variety of uses. It can be easily and readily deployed when needed. It is also easily taken down and put away when it is no longer needed.

The shielding system is self-contained and can be mounted on the equipment to be shielded or it can be fully supported on the ground. A plurality of shielding systems can be used in combination, if desired, for shielding large objects or areas.

Other advantages of the shielding system will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
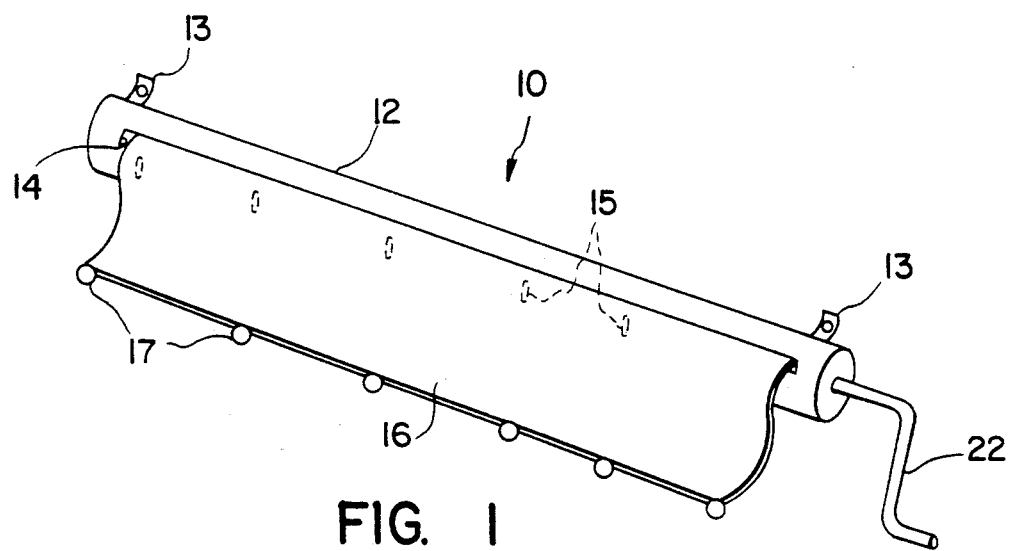
FIG. 1 is a perspective view of one embodiment of portable shielding system of the invention.
Figure 4:
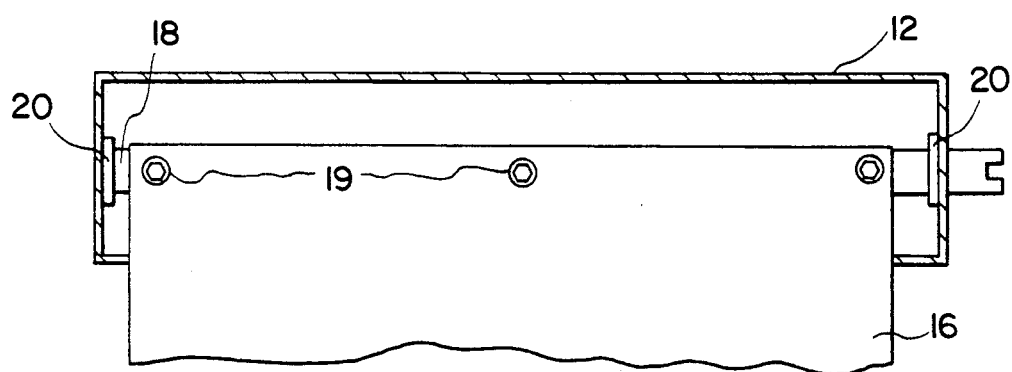
FIG. 4 is a cut-away front view of the shielding system of FIG. 1.
Figure 2:
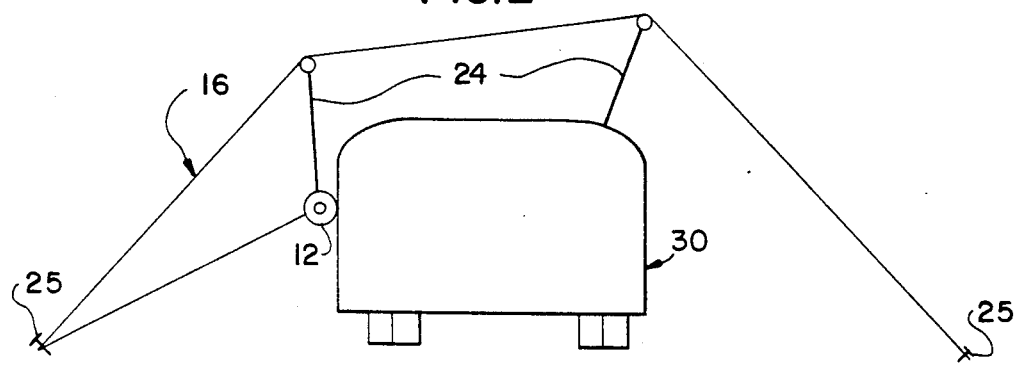
FIG. 2 is an elevational view illustrating use of the shielding system to shield equipment.

In FIGS. 1, 2 and 4 there is illustrated one embodiment of portable shielding system 10 of the invention. The system comprises an elongated tubular container or housing 12 having an elongated slot or opening 14 in the side wall. Mounting brackets 13 are secured to the container to facilitate mounting the container to a piece of equipment to be shielded or covered.

A length of flexible sheet material 16 is contained within the container. One end of the sheet material is secured to a rotatable shaft 18 in the container. For example, bolts 19 may be used to secure the end of the sheet material to be shaft. Bearings 20 support the shaft at opposite ends of the container.

A crank handle 22 can be attached to the outer end of the shaft 18 for the purpose of winding the sheet material onto the shaft. Preferably the crank handle is detachable.

The length of the sheet material may vary, as desired. For example, it may be 100 feet or more. The width may also vary, e.g., form about 3 feet up to 30 feet or more.

The flexible sheet material may comprise netting or other types of camouflage or screen. The netting may be stretchable if desired. It may be covered with an desired pattern.

The container 12 ay be of any desired length and diameter so as to accommodate the size of screen material used. Preferably the container is cylindrical, as illustrated.

The front wall of the container preferably includes hooks 15 to which the rings 17 on the free end of the sheet material can be attached. The hooks prevent the free end of the sheet material from passing into the container during transport and storage. The rings are also useful in staking or securing the free end of the sheet material to the ground during use.

As illustrated in FIG. 2, the container 12 can be attached to an object 30 to be shielded. Then the sheet material can be drawn out of the container and stretched over the object. As shown, the sheet material is anchored to the ground on both sides of the object (e.g., by stakes 25). To keep the sheet material from touching the object, one or more poles or leg members 24 may be positioned between the object and the sheet material. Some of the leg members may be supported by the container 12, as shown.

Figure 3:
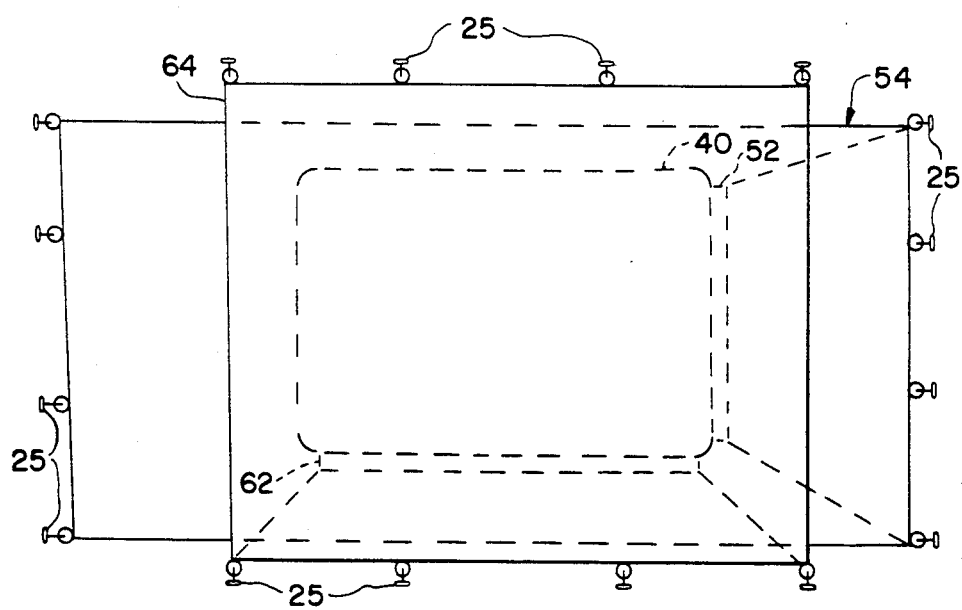
FIG. 3 is a top view illustrating use of two shielding systems to shield equipment.

FIG. 3 is a top view showing the use of multiple shielding systems in shielding an object 40. One shielding system comprises container 52 and flexible sheet material 54. The container 52 is secured to one side of the object, and the sheet material 54 is secured to the ground on two opposite sides of the object by means of stakes 25.

A second shielding system comprises container 62 and flexible sheet material 64. The container 62 is secured to one side of the object, and the sheet material 64 is secured to the ground on two opposite sides of the object by means of stakes 25.

The two shielding systems in FIG. 3 are arranged at 90° with respect to each other so as to effect nearly total shielding of the object 40. Other arrangements of shielding system could also be used.

Figure 5:
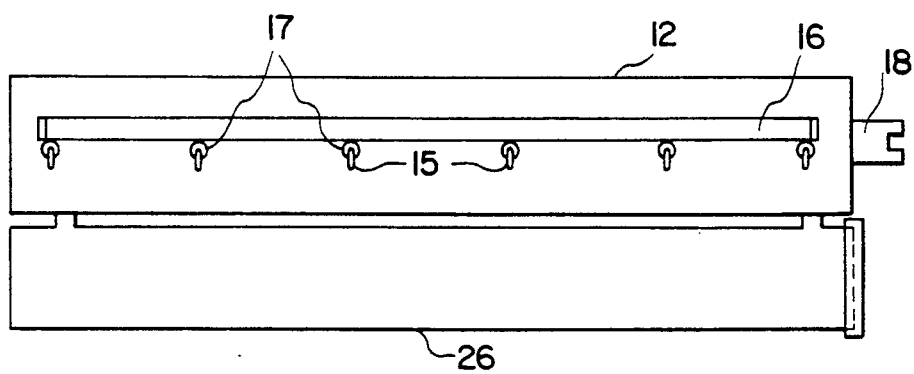
FIG. 5 is a front elevational view of another embodiment of shielding system of the invention.

FIG. 5 is a front elevational view of another embodiment of shielding system of the invention. In this embodiment a second housing or container 26 is attached to container 12. Support poles 24 can be stored in container 26 during transport and storage.

Other variants are possible without departing from the scope of the invention. The container or housing for the sheet material may be composed of metal, plastic, or composite materials. Leg members may be detachably secured to the container to assist in supporting the deployed sheet material over an object. The sheet material can be anchored to the ground by means of weights or stakes, or both, if desired. Multiple shielding systems may be used together, if desired. When they are used in side-by-side fashion the abutting edges of the sheet materials may be clipped together, if desired. Also, the sheet material may be wider than the length of the storage container (e.g., the edges of the sheet material can be folded so that the sheet material will fit into the container).

What is claimed is:

1. A portable shielding system for shielding an object comprising:
   (a) an elongated tubular container having a side wall, wherein said side wall includes an elongated opening therethrough;
   (b) a length of flexible sheet material carried in said container; wherein said sheet material includes a first end which is secured in said container and a second end which is accessible through said opening; wherein sheet material can be withdrawn from said container by pulling said second end of said sheet material;
   (c) retraction means for retracting said sheet material into said container; and
   (d) a plurality of leg members secured to said container for supporting at least a portion of said sheet material above and out of contact with said object.

2. A shielding system in accordance with claim 1, wherein said container is cylindrical.

3. A shielding system in accordance with claim 1, wherein said container further includes mounting brackets secured thereto for attachment of said container to an object to be shielded.

4. A shielding system in accordance with claim 1, further comprising an elongated rotatable shaft extending through the interior of said container; wherein said first end of said sheet material is attached to said shaft; and wherein said retraction means comprises a crank means for rotating said shaft to retract said sheet material into said container.

5. A shielding system in accordance with claim 4, wherein said crank means is detachable from said shaft.

6. A portable shielding system for shielding an object comprising:
   (a) an elongated tubular container having a side wall, wherein said side wall includes an elongated opening therethrough;
   (b) an elongated shaft rotatably mounted in said container;
   (c) a length of flexible sheet material carried in said container; wherein said sheet material includes a first end which is secured to said shaft and a second end which extends through said elongated opening; wherein said sheet material can be withdrawn from said container by pulling said second end of said sheet material;
   (d) retraction means for retracting said sheet material into said container;
   (e) mounting brackets secured to said container for attachment of said container to said object; and
   (f) a plurality of leg members for supporting at least a portion of said sheet material above and out of contact with said object.

7. A shielding system in accordance with claim 6, wherein said leg members comprise:
   a plurality of support poles for supporting said flexible sheet material after it has been withdrawn from said container; wherein said support poles can be stored in said container for transport.

8. A method for shielding an object, the method comprising the steps of:
   (a) providing a length of flexible sheet material having first and second ends;
   (b) providing an elongated tubular container having a side wall with an elongated opening in said side wall;
   (c) storing said sheet material in said container in a manner such that said second end extends through said opening and said first end is secured within said container;
   (d) providing a plurality of support poles;
   (e) withdrawing said sheet material from said container and extending it over said object;
   (f) supporting said sheet material above and out of contact with said object with said support poles.

9. A method in accordance with claim 8, comprising the further step of securing said sheet material to the ground on opposite sides of said object.

10. A method in accordance with claim 9, comprising the step of securing said sheet material to the ground by means of stakes.

11. A method in accordance with claim 8, comprising the further step of securing some of said support poles to said container.

12. A method in accordance with claim 8, comprising the further step of securing said container to said object.

13. A method in accordance with claim 8, wherein said sheet material is supported above and out of contact with said object.

* * * * *